United States Patent [19]
Reitmeier

[11] 4,393,414
[45] Jul. 12, 1983

[54] HORIZONTAL-RATE PHASE-CHANGE OF TV PIXEL DISTRIBUTION AMONG MULTIPLE RECORDER TRACKS FOR DROPOUT CONCEALMENT

[75] Inventor: Glenn A. Reitmeier, Trenton, N.J.

[73] Assignee: RCA Corporation, New York, N.Y.

[21] Appl. No.: 241,925

[22] Filed: Mar. 9, 1981

[51] Int. Cl.$^3$ .............................................. H04N 5/92
[52] U.S. Cl. .................................... 358/336; 358/314; 360/38.1
[58] Field of Search .................. 358/4, 8, 312, 314, 358/320, 330, 336, 337; 360/22, 38, 48, 39, 40, 32, 10, 11, 10.1, 10.2, 10.3, 11.1

[56] References Cited

U.S. PATENT DOCUMENTS

| | | | |
|---|---|---|---|
| 3,921,132 | 11/1975 | Baldwin | 358/8 X |
| 4,121,264 | 10/1978 | Kishi et al. | 360/55 |
| 4,146,099 | 3/1979 | Matsushima et al. | 360/38 X |
| 4,224,642 | 9/1980 | Mawatari et al. | 360/38 X |
| 4,232,329 | 11/1980 | Horak et al. | 360/22 X |
| 4,277,807 | 7/1981 | Baldwin | 358/4 X |
| 4,316,223 | 2/1982 | Baldwin et al. | 360/39 |
| 4,355,324 | 10/1982 | Reitmeier | 358/312 |

FOREIGN PATENT DOCUMENTS 2833900 2/1980 Fed. Rep. of Germany ........ 360/22

*Primary Examiner*—Bernard Konick
*Assistant Examiner*—Donald McElheny, Jr.
*Attorney, Agent, or Firm*—E. M. Whitacre; W. H. Meise

[57] ABSTRACT

A recording format is provided for video record and/or replay systems, which improves the operating performance and facilitates the implementation of many replay features. In this format, each raster of information is divided into at least two interleaved checkerboard pixel patterns and the pixels for each checkerboard pattern are recorded together and segregated from the pixels for the other checkerboard patterns.

7 Claims, 10 Drawing Figures

TR I: → $Y_1 I_1 Y_5 Q_1 Y_9 I_5 Y_{13} Q_5 Y_{17} ... Y_3 I_3 Y_7 Q_3 Y_{11} I_7 Y_{15} Q_7 Y_{19} ... Y_1 I_1 Y_5 Q_1 Y_9 I_5 Y_{13} Q_5 Y_{17} ... Y_3 I_3 Y_7 Q_3 Y_{11} I_7 Y_{15} Q_7 Y_{19} ...$

TR II: → $Y_2 I_2 Y_6 Q_2 Y_{10} I_6 Y_{14} Q_6 Y_{18} ... Y_4 I_4 Y_8 Q_4 Y_{12} I_8 Y_{16} Q_8 Y_{20} ... Y_2 I_2 Y_6 Q_2 Y_{10} I_6 Y_{14} Q_6 Y_{18} ... Y_4 I_4 Y_8 Q_4 Y_{12} I_8 Y_{16} Q_8 Y_{20} ...$

TR III: → $Y_3 I_3 Y_7 Q_3 Y_{11} I_7 Y_{15} Q_7 Y_{19} ... Y_1 I_1 Y_5 Q_1 Y_9 I_5 Y_{13} Q_5 Y_{17} ... Y_3 I_3 Y_7 Q_3 Y_{11} I_7 Y_{15} Q_7 Y_{19} ... Y_1 I_1 Y_5 Q_1 Y_9 I_5 Y_{13} Q_5 Y_{17} ...$

TR IV: → $Y_4 I_4 Y_8 Q_4 Y_{12} I_8 Y_{16} Q_8 Y_{20} ... Y_2 I_2 Y_6 Q_2 Y_{10} I_6 Y_{14} Q_6 Y_{18} ... Y_4 I_4 Y_8 Q_4 Y_{12} I_8 Y_{16} Q_8 Y_{20} ... Y_2 I_2 Y_6 Q_2 Y_{10} I_6 Y_{14} Q_6 Y_{18} ...$

LINE #1     LINE #2     LINE #3     LINE #4

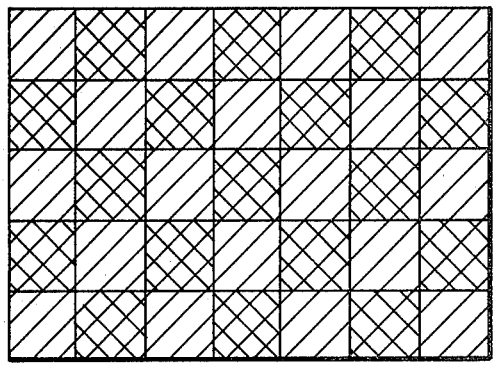
*Fig. 1*
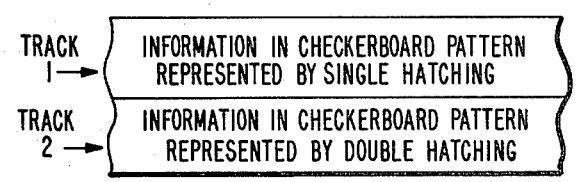
*Fig. 2*
| TR I : | ODD | EVEN | ODD | EVEN | ODD | EVEN | ODD | ... |
|---|---|---|---|---|---|---|---|---|
| TR II : | EVEN | ODD | EVEN | ODD | EVEN | ODD | EVEN | ... |
| T.V. LINES : | ① | ② | ③ | ④ | ⑤ | ⑥ | ⑦ | ... |
*Fig. 3*
|  | ① | ② | ③ | ④ | ⑤ | ⑥ | ⑦ | ⑧ |
|---|---|---|---|---|---|---|---|---|
| TR I : | ODD | EVEN | ODD | EVEN | ODD | EVEN | ODD | EVEN ... |
| TR II : |  |  |  |  | EVEN | ODD | EVEN | ODD ... |
| T.V. LINE NUMBERS ARE CIRCLED |  |  |  |  | ① | ② | ③ | ④ |
*Fig. 4*
| TR I : | POS. | NEG. | POS. | NEG. | POS. | NEG. | POS. | ... |
|---|---|---|---|---|---|---|---|---|
| TR II : | NEG. | POS. | NEG. | POS. | NEG. | POS. | NEG. | ... |
| T.V. LINES : | ① | ② | ③ | ④ | ⑤ | ⑥ | ⑦ | |
*Fig. 5*

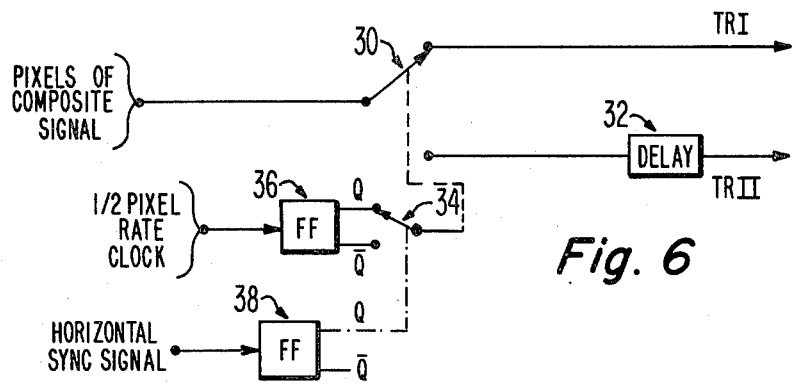
Fig. 6
TRI :  | $Y_1\ I_1\ Y_3\ Q_1\ Y_5\ I_3\ Y_7\ Q_3\ Y_9\ I_5\ Y_{11}\ Q_5\ ...$ | $Y_2\ I_2\ Y_4\ Q_2\ Y_6\ I_4\ Y_8\ Q_4\ Y_{10}\ I_6\ Y_{12}\ Q_6\ ...$
TRII : | $Y_2\ I_2\ Y_4\ Q_2\ Y_6\ I_4\ Y_8\ Q_4\ Y_{10}\ I_6\ Y_{12}\ Q_6\ ...$ | $Y_1\ I_1\ Y_3\ Q_1\ Y_5\ I_3\ Y_7\ Q_3\ Y_9\ I_5\ Y_{11}\ Q_5\ ...$
       | ODD SCAN LINES | EVEN SCAN LINES
Fig. 7
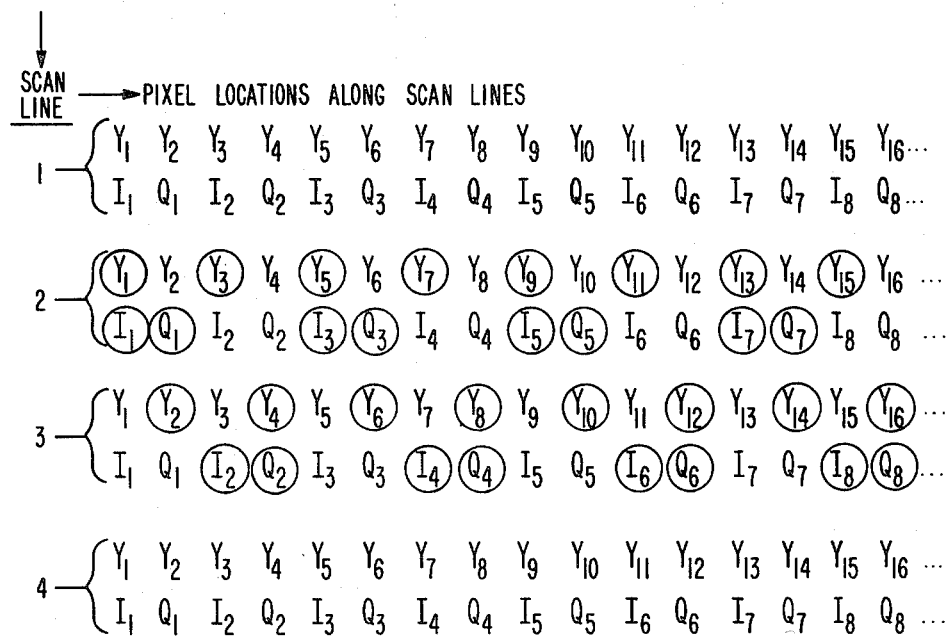
Fig. 8

TR I: → $Y_1$ $I_1$ $Y_5$ $Q_1$ $Y_9$ $I_5$ $Y_{13}$ $Q_5$ $Y_{17}$ ... $Y_3$ $I_3$ $Y_7$ $Q_3$ $Y_{11}$ $I_7$ $Y_{15}$ $Q_7$ $Y_{19}$ ...

TR II: → $Y_2$ $I_2$ $Y_6$ $Q_2$ $Y_{10}$ $I_6$ $Y_{14}$ $Q_6$ $Y_{18}$ ... $Y_4$ $I_4$ $Y_8$ $Q_4$ $Y_{12}$ $I_8$ $Y_{16}$ $Q_8$ $Y_{20}$ ...

TR III: → $Y_3$ $I_3$ $Y_7$ $Q_3$ $Y_{11}$ $I_7$ $Y_{15}$ $Q_7$ $Y_{19}$ ... $Y_1$ $I_1$ $Y_5$ $Q_1$ $Y_9$ $I_5$ $Y_{13}$ $Q_5$ $Y_{17}$ ...

TR IV: → $Y_4$ $I_4$ $Y_8$ $Q_4$ $Y_{12}$ $I_8$ $Y_{16}$ $Q_8$ $Y_{20}$ ... $Y_2$ $I_2$ $Y_6$ $Q_2$ $Y_{10}$ $I_6$ $Y_{14}$ $Q_6$ $Y_{18}$ ...

$\underbrace{\qquad}_{\text{LINE \#1}}$ $\underbrace{\qquad}_{\text{LINE \#2}}$ $\underbrace{\qquad}_{\text{LINE \#3}}$ $\underbrace{\qquad}_{\text{LINE \#4}}$

*Fig. 9*

HORIZONTAL-RATE PHASE-CHANGE OF TV PIXEL DISTRIBUTION AMONG MULTIPLE RECORDER TRACKS FOR DROPOUT CONCEALMENT

BACKGROUND OF THE INVENTION

In video record and replay systems, the potential performance and implementation complexity of features, such as dropout compensation or providing a viewable picture during search modes, depends on the nature of the recording format or the manner in which information is organized on the recorded medium. Defects on the recorded medium along tracks traveled by transducer heads recording or replaying information are the cause of a dropout. One example of such a defect is the stipples or bumps of magnetic oxide which occur periodically on a magnetic recorded medium. The stipples cause the transducer heads to be removed from the recorded medium and thereby cause information gaps while the transducer heads are removed from the recorded medium. During search modes, the speed of the recorded medium can vary anywhere from normal replay speeds to many times normal replay speed in both the forward and reverse directions and a video signal for each frame or field displayed must be reconstructed from only portions of many recorded fields or frames. Consequently, the timing necessary to reorganize the replayed information must be very precise and the circuitry which provides this timing can be quite complex. Furthermore, where each frame or field is recorded on a set of multiple tape tracks, such as in helical scan recording, it is desirable to replay information from less than the full number of tracks in each multiple set during any search mode. To simplify both the mechanical and electronic aspects of the record and/or replay system, it may be desirable to replay information from one track during any search mode. Since the recording format determines the availability of information at any time during replay, it also establishes limitations as to the approach taken for compensating or concealing a dropout and for reconstructing a viewable picture during search modes.

SUMMARY OF THE INVENTION

To facilitate dropout compensation or concealment and search mode picture reconstruction when a video recording is replayed, each raster of information is divided into at least two interleaved checkerboard pixel (picture elements or samples) patterns and the pixels for each checkerboard pattern are recorded together and segregated from the pixels for the other checkerboard patterns so that the information can be substantially reconstructed from a number of checkerboard pixel patterns less than the total number of interleaved checkerboard pixel patterns. Preferred embodiments relating to both composite and component televison signals are specifically disclosed.

BRIEF DESCRIPTION OF THE DRAWINGS

FIG. 1 is a video raster in which two interleaved checkerboard pixel patterns of information are presented;

FIG. 2 is one general recording format embodiment of the invention wherein checkerboard pixel patterns are recorded separately on adjacent tracks.

FIGS. 3 and 4 are particular versions of the general recording format embodiment in FIG. 2;

FIGS. 5 and 7 relate to television recording formats for composite and component signals respectively, in accordance with FIG. 3;

FIGS. 6 and 10 are preferred circuit embodiments for recording the FIGS. 5 and 7 televison signal formats respectively;

FIG. 8 is a raster representation of the television signal recording format of FIG. 7; and FIG. 9 is another recording format for the components of a television signal.

DESCRIPTION OF THE PREFERRED EMBODIMENTS

Figure 10:
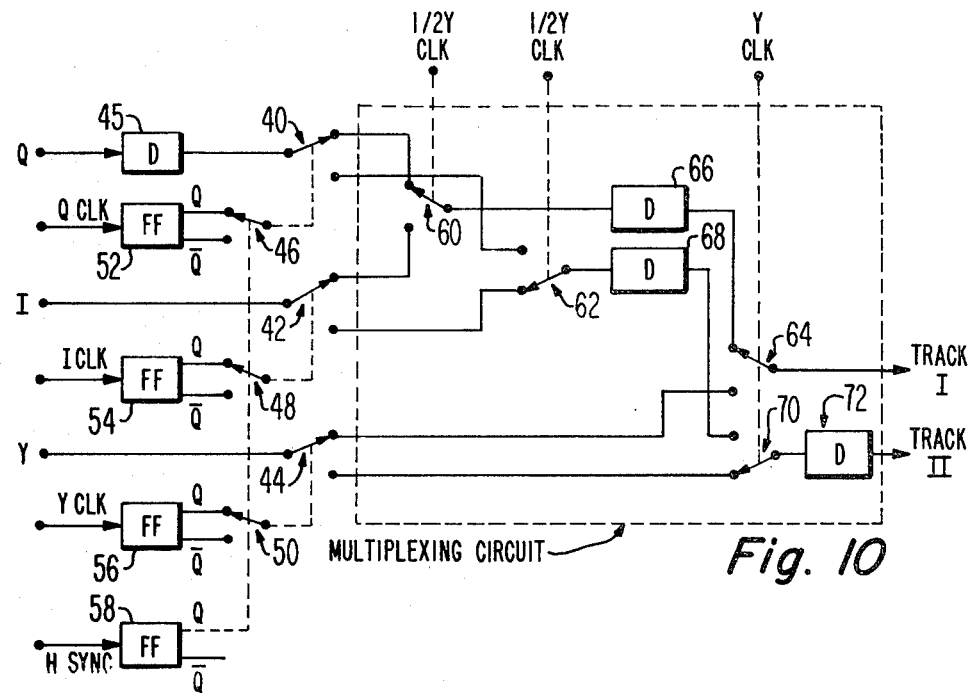

In video record and replay systems, the recorded signal is commonly related to the picture displayed by an orthogonal grid known as a raster. To improve the operating performance and facilitate the implementation of many replay features in record and replay systems which record pixels of the video information that are sampled at some predetermined frequency, the invention divides the raster into at least two interleaved checkerboard pixel patterns. Such a raster is shown in FIG. 1 where one checkerboard pixel pattern is represented by single hatching and the other checkerboard pixel pattern is represented by double hatching. The pixels in each checkerboard pattern are recorded together and segregated from the pixels in the other checkerboard patterns, such as is shown in FIG. 2 where the checkerboard pixel patterns of FIG. 1 are recorded on different tracks. Consequently, the information can be substantially reconstructed from a number of checkerboard patterns less than the total number of interleaved checkerboard patterns during replay. Therefore, those skilled in the art will appreciate that this invention relates to a video recording format which improves the performance and facilitates the implementation of raster reconstruction during replay, such as when dropout occurs or when a high-quality search-mode picture is desired.

Although those skilled in the art will understand without further explanation that the pixels in each checkerboard pattern could also be segregated on a single track, the preferred recording format embodiments of this invention in present-day record and/or replay systems would be multiple track embodiments. One such embodiment is illustrated in FIG. 3 for a television raster having a portion of each frame or field thereof recorded on a pair of adjacent tracks. The odd numbered pixels from the odd numbered raster scan lines and the even numbered pixels from the even numbered raster scan lines are recorded in one of the tracks, while the even numbered pixels from the odd numbered raster scan lines and the odd numbered pixels from the even numbered raster scan lines are recorded in the other track. Consequently, each track in this recording format contains half of the video information which is organized in a checkerboard pixel pattern relative to each portion of the frame or field recorded. Furthermore, each pixel recorded in one of the tracks has surrounding pixels (those located vertically, horizontally and diagonally relative thereto) recorded in the other track. Therefore, those skilled in the art will realize without further explanation that well known techniques can readily be utilized to replay coherent raster information from only one of the tracks during a picture search mode or when dropout occurs. Of course, pixels for a half-resolution raster of each recorded picture are available from either track, so that a recognizable picture could be reconstructed by scanning only one of the tracks during a scene search mode. Also, a dropout of unlimited length in one of the tracks can be concealed by deriving replacement information therefor from the other track. If dropout simultaneously affects both tracks, the information in one track could be offset relative to the information in the other track by a distance in proportion to the anticipated time of the dropout, as shown in FIG. 4 to thereby avoid the loss of horizontally adjacent pixels in the recording format.

The recording format of this invention could be disposed on any type of recording medium, such as tape or disc. It could also be utilized with any type of tape scanning arrangement such as in helical or longitudinal scan record and/or replay systems, with the pixels in each checkerboard pattern being segregated by distribution along a single track or into a plurality of tracks. Furthermore, the pixels recorded in the format of this invention could relate to either a composite signal or the components of a signal when the video information is a television signal.

When a composite television signal is digitally recorded, the pixels are commonly sampled at some multiple of the subcarrier frequency. Consequently, the recording formats of FIGS. 3 and 4 are also appropriate if their "odd" and "even" designations relate to similar pixel groups of either subcarrier cycles or half-cycles. One preferred recording format embodiment of the invention for a composite television signal is illustrated in FIG. 5. This embodiment is analogous to the embodiment of FIG. 3 in that pixels which relate to positive subcarrier half-cycles from odd numbered scan lines and pixels which relate to negative subcarrier half-cycles from even numbered scan lines are recorded in one track, while pixels which relate to negative subcarrier half-cycles from odd numbered scan lines and pixels which relate to positive subcarrier half-cycles from even numbered scan lines are recorded on another track. Of course, those skilled in the art will realize without further explanation that other composite signal embodiments analogous to the embodiment of FIG. 4 are also possible.

Although more than one hardware arrangement could be devised for recording a composite television signal in any particular embodiment of the invention, a preferred arrangement for a particular composite signal format is illustrated in FIG. 6. For illustrative purposes only, pixels of the composite signal are sampled at four times the subcarrier frequency to derive pixels relating to $Y+I$, $Y+Q$, $Y-I$ and $Y-Q$. In the format, these pixels are recorded on two tracks with $Y+I$ and $Y+Q$ recorded on one track and with $Y-I$ and $Y-Q$ recorded on the other track at offset locations in a fashion similar to that shown in FIG. 4. However, the nature of the particular format selected could have any number of tracks, as will be explained in describing this two track arrangement. The pixels of the composite signal are directed to a switch 30 having a number of output throw positions equal to the number of format tracks, which in this embodiment is two. Each output from the switch 30 is directed to a single track on the recording medium through a separate transducer (not shown) and the output to one of the tracks passes through a delay 32 which offsets the information in that track along the scan direction of the transducers relative to the information in the other track. When the offset format has more than two tracks, delays may be necessary in more than one track and those delays may be of the same duration or of different durations depending on the dropout characteristic of the recording medium and the nature of the particular format selected. The throw position of the switch 30 is controlled through another switch 34 by the output of a modulo counter 36 having a number of outputs equal to the number of format tracks and a programmable starting count output when the nature of the particular format selected so requires. Because the format only has two tracks, the modulo counter 36 is a flip flop having Q and $\overline{Q}$ outputs in this arrangement. The modulo counter 36 is driven by a one-half pixel rate clock of the composite signal and the throw position of switch 34 is controlled by the output of another modulo counter 38 having a number of outputs equal to the number of format tracks. Because the format only has two tracks, the modulo counter 38 is a flip flop in this hardware arrangement. The horizontal sync signal is applied to the modulo counter 38 and each horizontal sync pulse steps the modulo counter 38 to a different output which in turn sets the switch 34 to a different output of the modulo counter 36. Of course, those skilled in the art will realize without any further explanation that the combination of switch 34 and modulo counters 36 and 38 is a multiphase clock which controls the positioning of switch 30. Therefore, switch 34 would be eliminated when the starting count output of modulo counter 36 is programmable from the output of modulo counter 38. Switch 30 is set to a different track position for each output of modulo counter 36 and the pixels of the composite signal are thereby distributed to the tracks of the format with the $Y+I$ and $Y+Q$ pixels and the $Y-I$ and $Y-Q$ pixels respectively, being segregated into the interleaved checkerboard patterns with each pattern being recorded in separate tracks. Those skilled in the art will realize without further explanation that the hardware arrangement of FIG. 6 could also be utilized for recording the composite television signal in a format similar to that shown in FIG. 5, by merely deleting the delay 32 therefrom. It will also be readily understood by those skilled in the art that the hardware arrangement for replaying a particular recording format embodiment would essentially be the inverse of the particular hardware arrangement selected for recording that format. Consequently, the replay hardware arrangement for the record hardware arrangement of FIG. 6 would include a switch which receives the pixel information from the tracks on the recording medium and a multiphase clock to control that switch, while a delay would be disposed between that switch and track I.

Many different recording format embodiments of this invention are also possible when the pixels relate to the components of a signal. One such two-track embodiment for a color television signal having a luminance component (Y) and two chrominance components, for example I and Q, is illustrated in FIG. 7. For purposes of discussion only, the components are sampled in the ratio of 4:2:2 relative to Y, I and Q respectively, for this embodiment. However, the scope of the invention includes any other ratio of component sampling rates. FIG. 7 is analogous to FIG. 3 in that odd numbered component pixels from odd numbered scan lines and even numbered component pixels from even numbered scan lines are recorded on track I, while even numbered component pixels from odd numbered scan lines and odd numbered component pixels from even numbered scan lines are recorded on track II. Each component pixel would relate to a particular location along one scan line of the raster as illustrated by FIG. 8 wherein a luminance component pixel and a chrominance component pixel relate to each location along the scan lines. However, this particular raster array of pixels is not required, and each component could be sampled at either co-sited or separate locations along the scan lines, as desired. Each pixel of a component is numbered in accordance with its sequence of occurrence and at successive locations along the scan lines, the type of chrominance component pixel is alternated. Those pixels which are circled in FIG. 8 represent lost information due to the occurrence of a hypothetical dropout of track II in FIG. 7 for a duration of two raster scan lines (lines 2 and 3). By observing the pattern of uncircled pixels in the dropout affected portion of the raster in FIG. 8, it is seen that half of the information for this portion continues to be available from track I in FIG. 7. Also this available information is dispersed with pixels being provided thereby which surround or encircle the missing pixels due to the dropout. From this observation, a clear understanding is also derived as to how only one of the tracks in the FIG. 7 recording format need be scanned to reconstruct recognizable information and known pixel interpolation techniques could be utilized therewith to improve the quality of such reconstructed information. Of course, format embodiments could have more than two tracks when the pixels relate to the components of a signal and a four track format embodiment for the raster pixel organization of FIG. 8 is illustrated in FIG. 9.

One preferred hardware arrangement for a recording format similar to that of FIG. 7 but having the components of a television signal in a two track, offset, format is illustrated in FIG. 10. The nature of the particular format selected could have any number of tracks, as will be explained in describing this two track hardware arrangement. The pixels of each signal component are directed to individual switches 40, 42 and 44 which relate to the Q, I, and Y components respectively. Because the odd or even numbered Q pixels are always sampled with the even or odd numbered Y pixels respectively, as shown in FIG. 8, the Q pixels are directed to switch 40 through a delay 45 which causes each Q pixel to be recorded on one track when the next Y pixel is being recorded on the other track. Each switch 40, 42 and 44 has a number of output throw positions equal to the number of format tracks, which in this hardware embodiment is two. The outputs from the switches 40, 42 and 44 are directed to the tracks on the recording medium through a multiplexing circuit, with each track being recorded by a separate transducer (not shown). The throw positions of switches 40, 42 and 44 are each controlled individually through switches 46, 48 and 50 respectively, by the output of individual modulo counters 52, 54 and 56 respectively. Each modulo counter 52, 54 and 56 has a number of outputs equal to the number of format tracks and a programmable starting count output when the nature of the particular format selected so requires. Because the format only has two tracks, the modulo counters 52, 54 and 56 are each flip flops having Q and $\overline{Q}$ outputs in this hardware arrangement. Each modulo counter 52, 54 and 56 is driven by the pixel rate clock of the signal component to which its switch 40, 42 and 44 respectively, relates. The throw positions of the switch 46, 48 and 50 are gang controlled by the output of another modulo counter 58 having a number of outputs equal to the number of format tracks. Because the format being recorded by this hardware embodiment only has two tracks, the modulo counter 58 is a flip flop in this hardware arrangement. The horizontal sync signal is applied to the modulo counter 58 and each horizontal sync pulse steps the modulo counter 58 to a different output. Within the multiplexing circuit a switch 60 directs the Q and I components to track I, while a switch 62 directs the Q and I components to track II. Each of these switches 60 and 62 has a number of input throw positions equal to the number of format tracks which in this embodiment is two. The wiper of switch 60 passes pixel information through a delay 66 to one input throw position of a switch 64, while the wiper of switch 62 passes pixel information through a delay 68 to one input throw position of a switch 70. The throw position of switch 60 and 62 are each controlled to change at one-half the rate of the Y pixel clock and switch 60 is positioned to pass Q pixels when switch 62 is positioned to pass I pixels. Each switch 64 and 70 also has a number of input throw positions equal to the number of format tracks, which in this embodiment is two. The other input throw positions of switches 64 and 70 are individually connected to receive the Y pixels for track I and track II respectively, from the output throw positions of switch 44. The throw positions of switches 64 and 70 are each controlled to change at the rate of the Y pixel clock and switch 64 is positioned to pass the chrominance pixels (either I or Q) when switch 70 is positioned to pass Y pixels and vice versa. The wiper of switch 64 passes pixel information to track I, while the wiper of switch 70 passes pixel information through a delay 72 to track II. When the horizontal sync pulse steps the modulo counter 58 to a different output the switch 46, 48 and 50 step to different output throw positions of their modulo counters 52, 54 and 56 respectively. Each switch 40, 42 and 44 is thereby set to a different track position for each output position of their respective modulo counters 52, 54 and 56 so that the pixels in each checkerboard pattern of a signal component are thereby directed to a particular track input of the multiplexing circuit, in like manner to the hardware embodiment of FIG. 6. Of course, the delay 45 shifts the position of the Q component pixels in the format of FIG. 7 relative to their raster scan line locations in FIG. 8. Then within the multiplexing circuit, every other Y pixel clock pulse changes the input throw positions of switch 60 and 62 in order to direct the appropriate pixels of each chrominance component to the delays 66 and 68. These delays shift the position of the I and Q pixels relative to the originally corresponding Y pixels, so that every Y pixel clock pulse changes the input throw positions of switches 64 and 70 to direct the odd numbered pixels of each signal component to one track and the even numbered pixels of each signal component to the other track. As was discussed relative to the hardware embodiment of FIG. 6, delay 72 offsets the information recorded in track II along the scan direction of the transducers relative to the information recorded in track I. Furthermore, when the offset format has more than two tracks, delays may be necessary in more than one track and those delays may be of the same duration or of different durations depending on the dropout characteristic of the recorded medium and the nature of the particular format selected.

What I claim is:

1. A television signal processing apparatus for processing signals for recording time-sampled television signals on a multitrack recording medium, said processing apparatus comprising:

controllable pixel distributing means coupled to the source of television signals and to the multitrack recording medium for distributing pixels among the tracks;

pixel-rate related control signal generating means coupled to said controllable pixel distributing means and to a source of pixel-rate clock signals associated with said source of video signals for generating pixel-rate control signals for controlling said controllable pixel distributing means for distributing time-segmented pixels received in time sequence cyclically to each track in turn whereby a dropout in a single track having a duration of less than one line allows estimation of the value of the dropped-out pixels but a dropout in a single track having a duration greater than one horizontal line drops out sufficient data so estimation from adjacent pixels is no longer possible; and line-rate-related control signal generating means coupled to a source of line-rate signals associated with said source of television signals and with said controllable pixel distributing means for generating horizontal-line-rate control signals for controlling said controllable pixel distributing means for progressively changing the phase of said cyclical distribution of time-sequential pixels among said tracks at a rate which is the horizontal line rate divided by $(N+1)$, where N represents the number of horizontal lines in the spatial pixel distribution of the raster which occur between identical line pixel patterns, whereby a dropout of one track for a time duration in excess of one horizontal line does not drop out spatially adjacent pixels whereby extimation of the value of the dropped-out pixels may be made from spatially adjacent pixels.

2. An apparatus according to claim 1 wherein said spatial pixel distribution is identical from line to line whereby $N=0$ and said change in phase of said cyclical distribution of pixels occurs at said horizontal line rate.

3. An apparatus according to claim 1 wherein said controllable pixel distributing means comprises controllable multi-throw switch means including a wiper and a plurality of associated output terminals, each of said output terminals being coupled to one of said tracks.

4. An apparatus according to claim 1 wherein said multi-throw switch means has two throw positions for coupling said source of signals to said two tracks.

5. An apparatus according to claim 2 wherein said pixel-rate related control signal generating means comprises a flip-flop for controlling said controllable pixel distributing means for distributing pixels received in time sequence alternately to first and second tracks.

6. An apparatus according to claim 2 wherein said line-rate related control signal generating means comprises a flip-flop for generating a half-line-rate signal for controlling said controllable pixel distributing means for distributing said time-sequential pixels between two tracks in a first phase during a first alternating set of horizontal lines and in a second phase during a second alternating set of horizontal lines interleaved with said first set.

7. An apparatus according to claim 6 wherein the first pixel and subsequent odd pixels of each horizontal line of said first set is coupled to track number 1 for recording and the second pixel and subsequent even pixels of each horizontal line of said first set is coupled to track number 2 for recording.

* * * * *